(12) United States Patent
Aoshima

(10) Patent No.: US 6,591,066 B2
(45) Date of Patent: Jul. 8, 2003

(54) MOTOR AND PHOTOGRAPHING APPARATUS

(75) Inventor: Chikara Aoshima, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/183,825

(22) Filed: Jun. 27, 2002

(65) Prior Publication Data

US 2003/0007799 A1 Jan. 9, 2003

(30) Foreign Application Priority Data

Jul. 6, 2001 (JP) .......................... 2001-206302
Dec. 19, 2001 (JP) .......................... 2001-385489

(51) Int. Cl.[7] .................. G03B 9/08; G03B 3/10; H02K 37/10
(52) U.S. Cl. ................ 396/133; 396/463; 310/49 R
(58) Field of Search ................... 396/133, 463, 396/508; 310/46 R

(56) References Cited

U.S. PATENT DOCUMENTS 5,831,356 A * 11/1998 Aoshima ................. 310/49 R

2002/0127013 A1 * 9/2002 Mizumaki et al. .......... 396/463

* cited by examiner

Primary Examiner—W. B. Perkey
(74) Attorney, Agent, or Firm—Robin, Blecker & Daley

(57) ABSTRACT

For providing a motor having a reduced length in the axial direction, the motor of the present invention comprises a rotor having a cylindrical magnet having an outer surface divided into portions in a circumferential direction which are alternately magnetized to different poles, a first outer magnetic pole which is excited by a first coil and faces the outer surface of the magnet within a first predetermined angular range, a first inner magnetic pole which is excited by the first coil and faces an inner surface of the magnet, a second outer magnetic pole which is excited by a second coil and faces the outer surface of the magnet within a second predetermined angular range, and a second inner magnetic pole which is excited by the second coil and faces the inner surface of the magnet, wherein the first and second outer magnetic poles are positioned on the same circumference centered on the magnet.

19 Claims, 14 Drawing Sheets

MOTOR AND PHOTOGRAPHING APPARATUS

BACKGROUND OF THE INVENTION

1. Field of the Invention

The present invention relates to a motor suitable for a reduction in size and optical apparatus using the motor.

2. Related Background Art

FIG. 16 is a sectional view showing an arrangement of a conventional stepping motor. FIG. 17 is a partial sectional view simply illustrating magnetic fluxes flowing from the stator of the stepping motor in FIG. 16.

Referring to FIG. 16, two bobbins 101 having stator coils 105 wound therearound are juxtaposed in the axial direction of a rotor 109. These two bobbins 101 are respectively fixed to different stator yokes 106. Stator teeth 106a and 106b are alternately formed on the inner diameter surface of each stator yoke 106. The stator yokes 106 are respectively fixed to cases 103. Two stators 102 respectively corresponding to the two excitation stator coils 105 are constituted by these members.

A flange 115 and bearing 108 are fixed to one of the two cases 103, and the other bearing 108 is fixed to the other case 103. A rotor 109 is formed from a rotor magnet 111 fixed to a rotor shaft 110. The rotor shaft 110 is rotatably supported by the two bearings 108.

In the stepping motor described above, however, since the cases 103, bobbins 101, stator coils 105, and stator yokes 106 are arranged on the outer surface of the rotor 109, the outer dimension of the motor becomes large. In addition, the magnetic fluxes which are generated when the stator coils 105 are energized mainly pass through an end face 106a1 of the stator tooth 106a and an end face 106b1 of the stator tooth 106b, as shown in FIG. 17. For this reason, much of magnetic flux does not act on the rotor magnet 111, and hence the motor output does not increase much.

In order to increase the output of a motor while decreasing its size, a motor having an arrangement like the one disclosed in U.S. Pat. No. 5,831,356 has been proposed. In this motor, a rotor is formed by dividing a cylindrical permanent magnet into equal portions in the circumferential direction and alternately magnetizing the portions to different poles, and the first coil, rotor, and second coil are sequentially arranged in the axial direction of the rotor (the axial direction of the motor). The first outer magnetic poles and first inner magnetic poles which are excited by the first coil are arranged to face the outer and inner surfaces of one half portion of the rotor in the axial direction, whereas the second outer magnetic poles and second inner magnetic poles which are excited by the second coil are arranged to face the outer and inner surfaces of the other half portion of the rotor in the axial direction.

FIG. 18 is a sectional view of a motor having the above arrangement. This motor includes a magnet 311, a first coil 312, a second coil 313, a first stator 314, first outer magnetic poles 314a and 314b, first inner magnetic poles 314c and 314d, a second stator 315, second outer magnetic poles 315a and 315b, second inner magnetic poles 315c and 315d, a coupling ring 316 for holding the first stator 314 and second stator 315, and an output shaft 317 to which the magnet 311 is fixed and which rotates together with the magnet 311. This output shaft 317 is rotatably supported by bearing portions 314e and 315e of the first and second stators 314 and 315.

According to this arrangement, a motor having a high output level and a small diameter can be provided.

Unlike such a motor having a reduced diameter, a motor having a reduced length in the axial direction is disclosed in Japanese Patent Application Laid-Open No. 2000-50601. FIG. 19 shows this motor. The motor is constituted by a plurality of coils 301, 302, and 303 and a disk-like magnet 304. As shown in FIG. 19, each coil has a thin coin-like shape, whose axis is parallel to the axis of the magnet. The disk-like magnet is magnetized in the axial direction of the disk-like shape, and the magnetized surface of the magnet faces the axis of the coil.

According to this arrangement, as indicated by the arrows in FIG. 20, a large number of magnetic fluxes generated from the coils do not pass through the magnet. The output level is therefore not high for the size of the motor.

There seems to be room for improvement in providing a motor having a reduced length in the axial direction.

SUMMARY OF THE INVENTION

According to an aspect of the present invention, there is provided a motor comprising a rotor having a cylindrical magnet having an outer surface divided into portions in a circumferential direction which are alternately magnetized to different poles, a first outer magnetic pole which is excited by a first coil and faces the outer surface of the magnet within a first predetermined angular range, a first inner magnetic pole which is excited by the first coil and faces an inner surface of the magnet, a second outer magnetic pole which is excited by a second coil and faces the outer surface of the magnet within a second predetermined angular range, and a second inner magnetic pole which is excited by the second coil and faces the inner surface of the magnet, wherein the first and second outer magnetic poles are positioned on the same circumference centered on the magnet.

According to another aspect of the present invention, there is provided a motor comprising a rotatable rotor having a cylindrical magnet having an outer surface alternately magnetized to different poles in a circumferential, a first outer magnetic pole which is excited by a first coil and faces the outer surface of the magnet, a second outer magnetic pole which is excited by a second coil and faces the outer surface of the magnet, and an inner magnetic pole which faces an inner surface of the magnet, wherein the first and second outer magnetic poles are positioned on the same circumference centered on the magnet, and when the center of one outer magnetic pole faces the center of a region of the magnet, the center of the other outer magnetic pole faces a boundary portion between regions of the magnet.

In addition, there are provided a photographing apparatus which translates a lens holder by using this motor as a driving source and a photographing apparatus which opens shutter blades by using the motor as a driving source.

DETAILED DESCRIPTION OF THE PREFERRED EMBODIMENT

Figure 1:
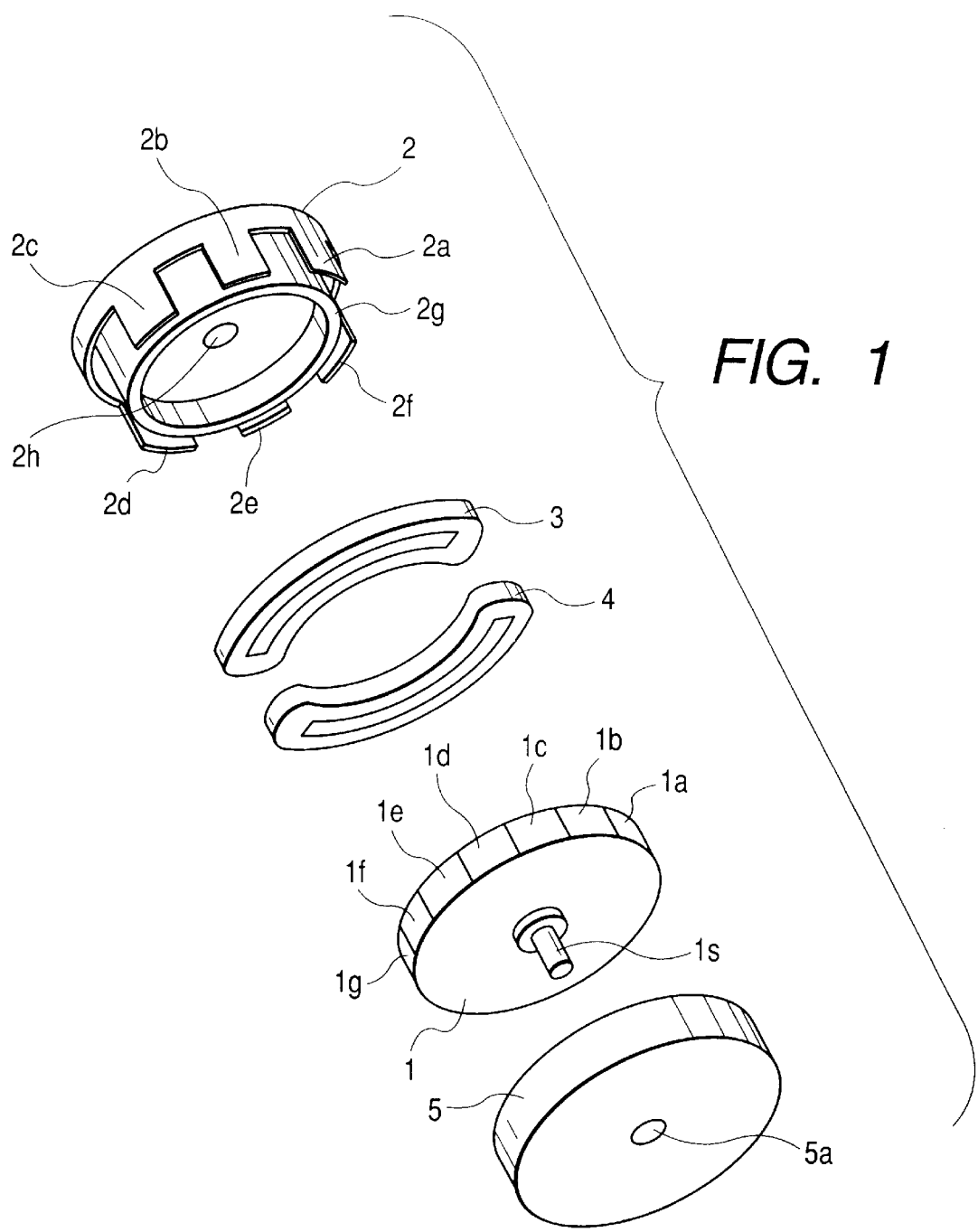
FIG. 1 is an exploded perspective view showing a motor according to an embodiment of the present invention.
Figure 2:
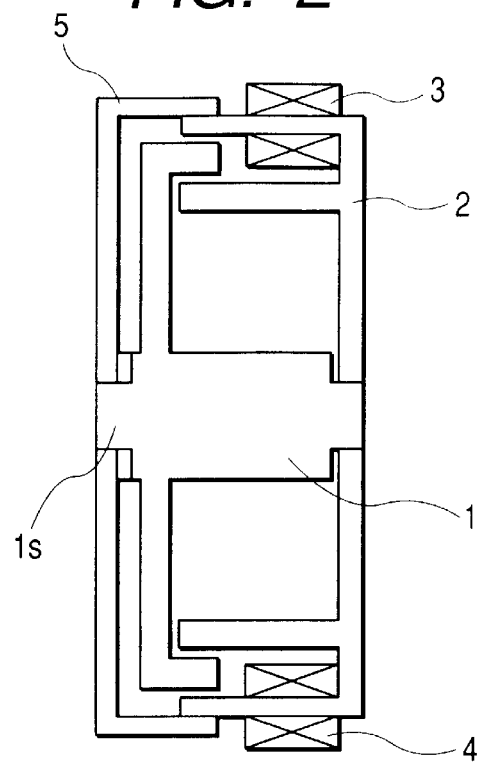
FIG. 2 is a sectional view taken along a plane parallel to the axial direction of the motor in FIG. 1.
Figure 3:
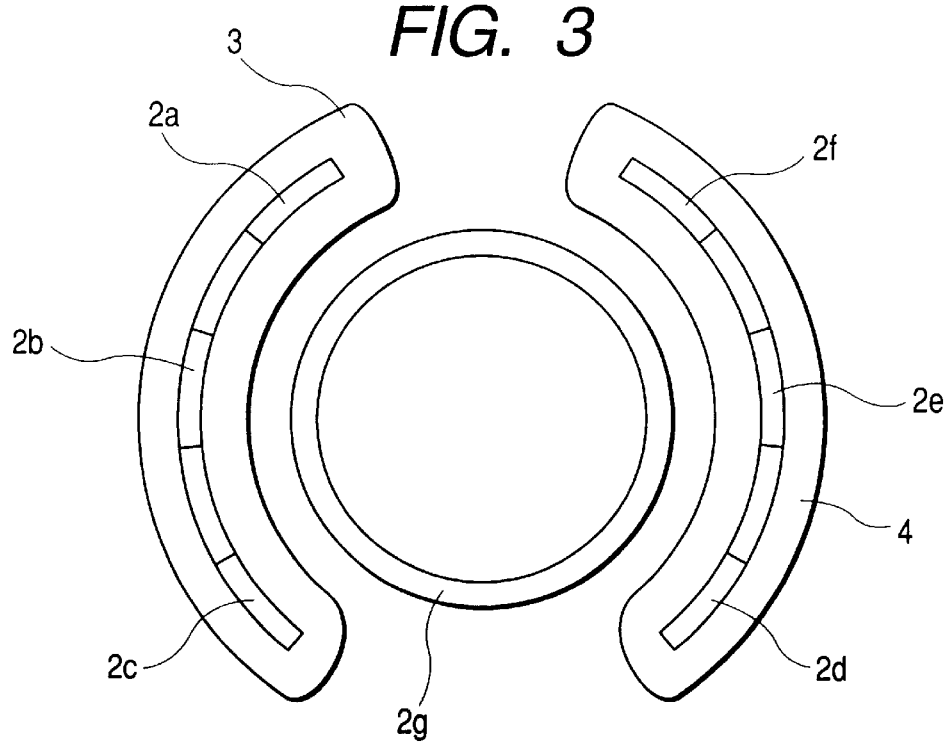
FIG. 3 is a sectional view taken along a plane which crosses a coil of the motor in FIG. 1 and is perpendicular to the axial direction.

FIG. 1 is an exploded perspective view of a motor to which the present invention is applied. FIG. 2 is a sectional view taken along a plane parallel to the axis of this motor. FIG. 3 is a sectional view taken along a plane perpendicular to the axial direction of this motor. A rotor 1 is comprised of a shaft portion and a cylindrical magnet formed from a permanent magnet. The outer surface of this magnet is divided into a plurality of regions in the circumferential direction, and the divided regions are alternately magnetized to the S and N poles. Note that the outer surface of the magnet of the motor in FIG. 1 is divided into 16 regions. The shaft portion and cylindrical magnet may be integrally molded. Alternatively, they may be separately molded and coupled to each other with an adhesive or by press-fitting.

The magnet is made of a plastic magnet material. The magnet can be formed into a very thin cylindrical shape by injection molding or the like. The inner surface of the magnet is in one of the following states: having a weaker magnetization distribution than the outer surface; not magnetized at all; and magnetized to the opposite pole to that of the outer surface, that is, if a given outer surface portion is magnetized to the S pole, an inner surface portion in the corresponding range is magnetized to the N pole. A shaft portion 1s of the rotor 1 is rotatably fitted in a fitting hole 5a of a cover 5 (to be described later) and a fitting hole 2h of a stator 2.

The stator 2 is made of a soft magnetic material and has outer and inner cylinders. One end of the shaft portion 1s of the rotor 1 is rotatably fitted in the stator 2. Unlike the device disclosed in U.S. Pat. No. 5,831,356, one stator will suffices. According to the motor in FIG. 1, an inner cylinder 2g is integrally molded with the outer cylinder having first outer magnetic poles 2a, 2b, and 2c and second outer magnetic poles 2d, 2e, and 2f. However, the inner cylinder 2g may be molded as a separate member and coupled to the outer cylinder. The first and second outer magnetic poles 2a to 2f are formed to extend in sawtooth shapes in a direction parallel to the shaft portion 1s by notching the outer cylinder from the direction of the distal end. The outer magnetic poles 2a to 2f oppose the outer surface of the magnet of the rotor 1 and are arranged side by side in the circumferential direction. When the distal end portion of the outer cylinder is viewed along the circumferential direction, a plurality of outer magnetic poles are arranged with spaces being set therebetween.

Assume that the outer magnetic poles are formed by recesses/projections extending in the radial direction instead of being formed into sawtooth shapes by setting spaces between the magnetic poles in the circumferential direction. In this case, in order to make the magnetic poles effectively function, the influence of magnetic flux from the recess portions must be reduced, and the influence of magnetic flux from the projection projections must be increased. This makes it necessary to increase the difference between the recess and projection portions. As a consequence, the diameter of the motor increases by the difference between the recess and projection portions. In contrast to this, in the motor in FIG. 1, only the thickness of a flat plate that is used to form outer magnetic poles needs to be increased.

The stator 2 in FIG. 1 is formed from a single member, and the first outer magnetic poles 2a, 2b, and 2c and the second outer magnetic poles 2d, 2e, and 2f are integrally formed. As compared with a case wherein the respective groups of outer magnetic poles are formed from different members, the mutual errors between the first outer magnetic poles 2a, 2b, and 2c and the second outer magnetic poles 2d, 2e, and 2f can be suppressed low, and hence variations in the performance of motors due to assembly errors can be suppressed.

A first coil 3 is wound around the first outer magnetic poles 2a, 2b, and 2c. When the first coil 3 is energized, it excites the first outer magnetic poles 2a, 2b, and 2c and portions of the inner cylinder 2g which serve as inner magnetic poles facing the first outer magnetic poles 2a, 2b, and 2c. Obviously, in this case, the first outer magnetic poles and the inner magnetic poles facing them are excited to different poles.

A second coil 4 is wound around the second outer magnetic poles 2d, 2e, and 2f. When the second coil 4 is energized, it excites the second outer magnetic poles 2d, 2e, and 2f and portions of the inner cylinder 2g which serve as inner magnetic poles facing the second outer magnetic poles 2d, 2e, and 2f. Obviously, in this case, the second outer magnetic poles and the inner magnetic poles facing them are excited to different poles.

The portions of the inner cylinder 2g which face the first outer magnetic poles are excited by the first coil 3, whereas the portions of the inner cylinder 2g which face the second outer magnetic poles are excited by the second coil 4. They are excited independently of each other. The portions that face the first outer magnetic poles 2a, 2b, and 2c and are excited by the first coil 3 will be referred to as first inner magnetic poles. The portions that face the second outer magnetic poles 2d, 2e, and 2f and are excited by the second coil 4 will be referred to as second inner magnetic poles. The first and second inner magnetic poles may be integrally formed as in this embodiment or may be formed separately. In addition, these inner magnetic poles may be formed into teeth shape extending in a direction parallel to the axis by notching the cylindrical member like the first outer magnetic poles 2a, 2b, and 2c or second outer magnetic poles 2d, 2e, and 2f.

The first outer magnetic poles 2a, 2b, and 2c and first inner magnetic poles of the stator 2 are formed to face the outer and inner surfaces of the magnet of the rotor 1 so as to sandwich the magnet. The second outer magnetic poles 2d, 2e, and 2f and second inner magnetic poles are also formed to face the outer and inner surfaces of the magnet of the rotor 1 so as to sandwich the magnet.

When the first coil 3 is energized, the first outer magnetic poles 2a, 2b, and 2c and the first inner magnetic poles are excited, and a magnetic flux is generated between the magnetic poles, which flows through the magnet of the rotor 1. Likewise, when the second coil 4 is energized, the second outer magnetic poles 2d, 2e, and 2f and the second inner magnetic poles are excited, and a magnetic flux is generated between the magnetic poles, which flows through the magnet of the rotor 1. Since most of the magnetic fluxes generated from the coils flow between the outer and inner magnetic poles, a high output can be obtained with a small current.

Since the magnet, outer magnetic poles, and inner magnetic pole are all formed from flat plates in cylindrical shapes, the distance between the first outer magnetic poles 2a, 2b, and 2c and the first inner magnetic poles and the distance between the second outer magnetic poles 2d, 2e, and 2f and the second inner magnetic poles can be greatly reduced. This makes it possible to decrease the magnetic resistance of the magnetic circuit formed from the first coil 3, first outer magnetic poles 2a, 2b, and 2c, and first inner magnetic poles and the magnetic resistance of the magnetic circuit formed from the second coil 4, second outer magnetic poles 2d, 2e, and 2f, and second inner magnetic poles. Therefore, a large amount of magnetic flux can be generated with a small current, and an increase in the output of the motor, a reduction in power consumption, and a reduction in coil size can be attained.

The inner surface of the distal end portion of the cover 5 is fixed to the outer surfaces of the outer magnetic poles. The shaft portion 1s of the rotor 1 is rotatably fitted in the fitting hole 5a of the cover 5.

Figure 4:
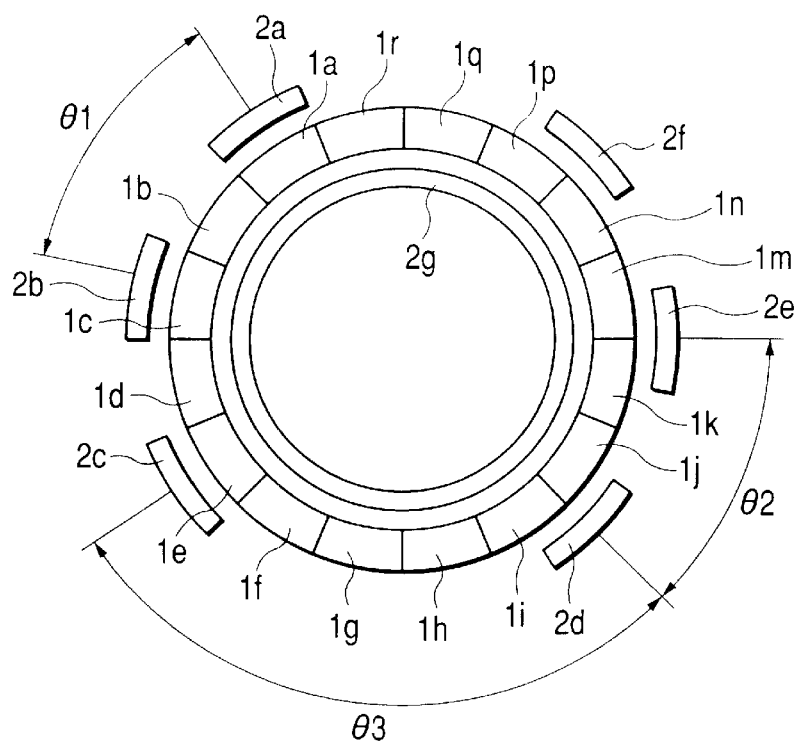
FIG. 4 is a view showing the positional relationship between the magnet and outer magnetic poles of the motor in FIG. 1.

FIG. 4 is a sectional view showing the positional relationship between the magnet of the rotor 1 and the stator. The outer surface of the magnet is divided into equal portions (16 portions in FIG. 4) in the circumferential direction, which are then alternately magnetized to the S and N poles, thereby forming magnetized portions 1a, 1b, 1c, 1d, 1e, 1f, 1g, 1h, 1i, 1j, 1k, 1m, 1n, 1p, 1q, and 1r. In this case, the magnetized portions 1a, 1c, 1e, 1g, 1i, 1k, 1n, and 1q are magnetized to the S pole, whereas the magnetized portions 1b, 1d, 1f, 1h, 1j, 1m, 1p, and 1r are magnetized to the N pole.

The positional relationship between the magnet and the outer magnetic poles will be described below. Letting NA (NA=16 in FIG. 4) be the number by which the outer surface of the magnet is divided, the first outer magnetic poles 2a, 2b, and 2c of the stator 2 are shifted from each other by an integer multiple of 360/(NA/2)°, i.e., an integer multiple of 45° in FIG. 4, so as to be in phase with the magnetization phase of the magnet.

The second outer magnetic poles 2d, 2e, and 2f of the stator 2 are also shifted from each other by an integer multiple of 360/(NA/2)°, i.e., an integer multiple of 45°, so as to be in phase with the magnetization phase. The overall first outer magnetic poles are shifted from the overall second outer magnetic poles by (180/NA+X×360/NA)°, i.e., (11.25+22.5×X)°. It suffices if X in this mathematical expression is an integer. Referring to FIG. 4, NA=16 and X=4, and the phase shift between the overall first outer magnetic poles and the overall second outer magnetic poles is 101.25°. In other words, the first outer magnetic poles are (180/NA)° out of phase with respect to the second outer magnetic poles.

One of the characteristic features of this motor is that the first and second outer magnetic poles are arranged on the same circumference of a circle so as to be out of phase with each other. When the rotor 1 rotates, magnetic fluxes generated by the first and second outer magnetic poles alternately act on the same portion of the rotor. As the rotor rotates, the two outer magnetic poles make magnetic fluxes act on the same portion of the magnet. This makes it possible to realize a motor having stable performance without being affected by variations and the like due to magnetization of the magnet.

The operation of the stepping motor according to the embodiment of the present invention will be described next with reference to FIGS. 4 to 7.

The motor in FIG. 4 is in the first energization state in which the first outer magnetic poles 2a, 2b, and 2c of the stator 2 are excited to the N pole and the first inner magnetic poles are excited to the S pole by energizing the first coil 3 in the forward direction. In this state, the second coil 4 is not energized.

Assume that the energization to the first coil 3 in the state shown in FIG. 4 is interrupted, and at the same time, the second energization state is set in which the second outer magnetic poles 2d, 2e, and 2f are excited to the N pole and the second inner magnetic poles are excited to the S pole by energizing the second coil 4 in the forward direction. In this case, as shown in FIG. 5, the rotor 1 rotates counterclockwise by 11.25°.

Figure 5:
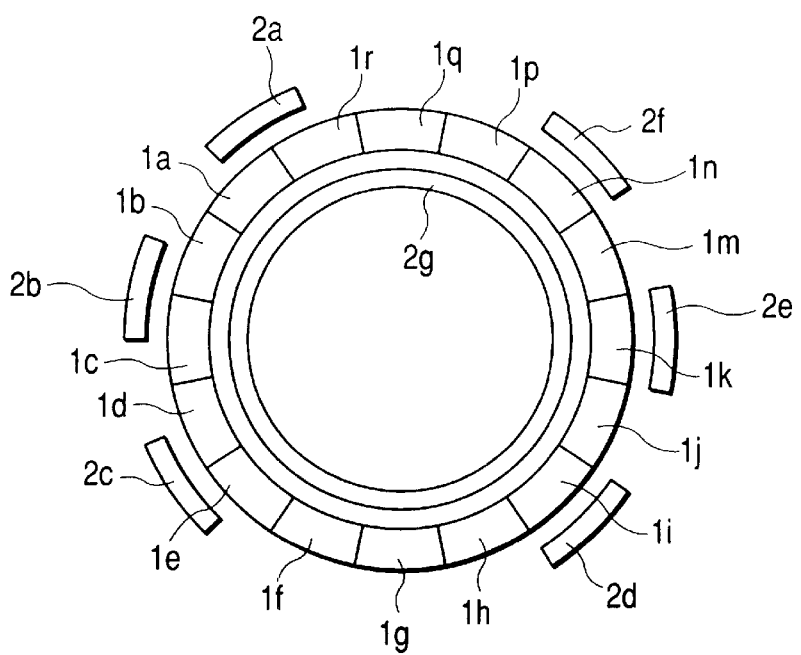
FIG. 5 is a view showing the positional relationship between the magnet and the outer magnetic poles in a case wherein energization for the motor in FIG. 4 is changed.

Assume that the energization to the second coil 4 in the state shown in FIG. 5 is interrupted, and at the same time, the third energization state is set in which the first outer magnetic poles 2a, 2b, and 2c are excited to the S pole and the first inner magnetic poles are excited to the N pole by energizing the first coil 3 in a direction opposite to that in the state of FIG. 4. In this case, as shown in FIG. 6, the rotor 1 further rotates counterclockwise by 11.25°.

Figure 6:
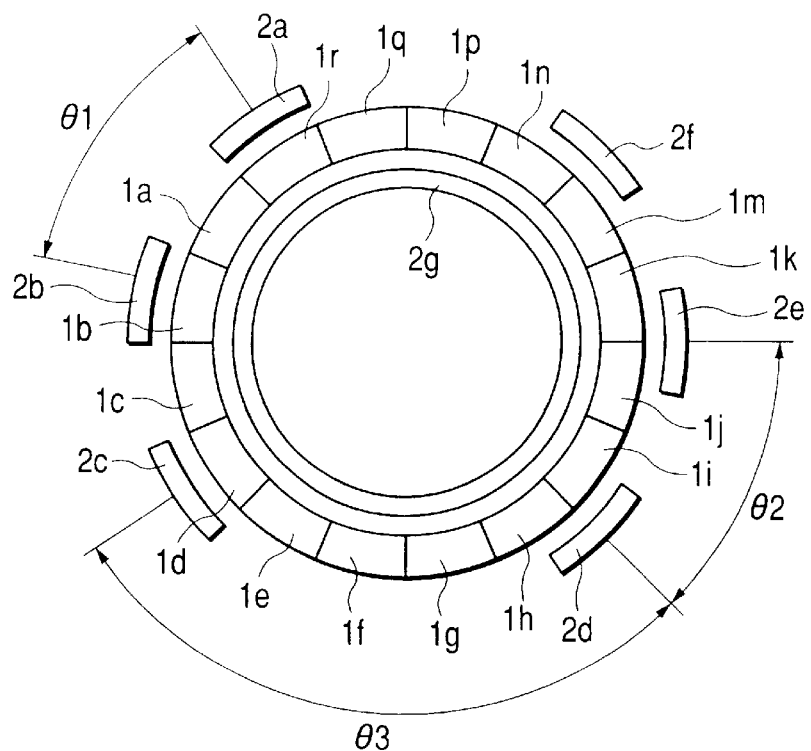
FIG. 6 is a view showing the positional relationship between the magnet and the outer magnetic poles in a case wherein energization for the motor in FIG. 5 is changed.
Figure 7:
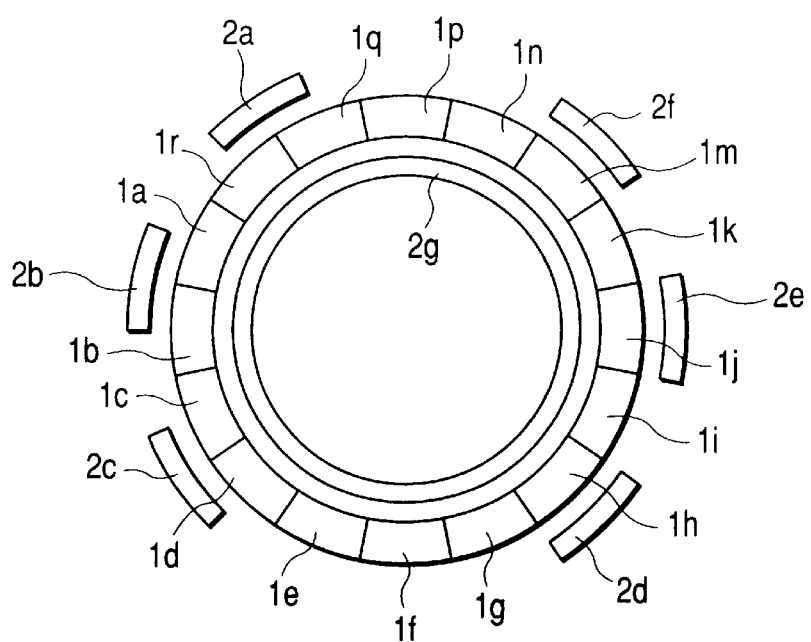
FIG. 7 is a view showing the positional relationship between the magnet and the outer magnetic poles in a case wherein energization for the motor in FIG. 6 is changed.

Assume that the energization to the first coil 3 in the state shown in FIG. 6 is interrupted, and at the same time, the fourth energization state is set in which the second outer magnetic poles 2d, 2e, and 2f are excited to the S pole and the second inner magnetic poles are excited to the N pole by energizing the second coil 4 in a direction opposite to that in the state of FIG. 5. In this case, as shown in FIG. 7, the rotor 1 further rotates counterclockwise by 11.25°.

Subsequently, by sequentially switching the energization states for the first and second coils 3 and 4 in this manner, the excitation of the first outer magnetic poles 2a, 2b, and 2c and the excitation of the second outer magnetic poles 2d, 2e, and 2f are switched at different timings. The rotor 1 will rotate to positions corresponding to the energization phases. The method of rotating the rotor is not limited to this.

Assume that the fifth energization state is a state wherein the first coil 3 is energized in the forward direction, and the second coil 4 is energized in the forward direction, the sixth energization state is a state wherein the first coil 3 is energized in the forward direction, and the second coil 4 is energized in the reverse direction, the seventh energization state is a state wherein the first coil 3 is energized in the reverse direction, and the second coil 4 is energized in the reverse direction, and the eighth energization state is a state wherein the first coil 3 is energized in the reverse direction, and the second coil 4 is energized in the forward direction. In this case, the energization state may be switched from the fifth energization state to the sixth energization state, seventh energization state, and eighth energization state. Alternatively, the energization state may be switched from the fifth energization state to the eighth energization state, seventh energization state, and sixth energization state. By this method as well, the rotor 1 rotates to rotational positions corresponding to the energization phases.

The positional relationship between the first and second outer magnetic poles has been described above. The positional relationship between the magnet and the first and second outer magnetic poles will be described below.

In the energization method described first, the first and second outer magnetic poles are alternately excited by switching the first, second, third, and fourth energization states.

When the first outer magnetic poles are excited, the central portion of each first outer magnetic pole faces the central portion of a corresponding magnetized portion of the magnet. At this time, the central portion of each second outer magnetic pole faces the boundary between corresponding magnetized portions of the magnet.

In contrast to this, when the second outer magnetic poles are excited, the central portion of each second outer magnetic pole faces the central portion of a corresponding magnetized portion of the magnet, and the central portion of each first outer magnetic pole faces the boundary between corresponding magnetized portions of the magnet.

As described above, since the first and second outer magnetic poles are out of phase with each other by a degree corresponding to ½ the area of the magnetized portion of the magnet, the rotor rotates through a degree corresponding to ½ the area of the magnetized portion every time energization is switched between the first and second outer magnetic poles. That is, with a magnet divided into 16 portions, the rotor rotates 11.25(=360/16/2)° at a time.

Referring to FIGS. 1 to 7, the first outer magnetic poles are arranged together on one side of the rotor, and the second outer magnetic poles are arranged together on the other side of the rotor in order to facilitate winding the coils. However, the present invention is not limited to this. The first and second outer magnetic poles may be alternately arranged. In this case, however, the first and second coils for exciting the outer magnetic poles must be positioned in accordance with the above arrangement. For example, independent coils may be alternately arranged to excite the first and second outer magnetic poles which are alternately arranged.

The rotor 1 has the shaft portion 1s and is rotatably held at this portion. If, however, the rotor is designed to be held on the circumferential portion of the magnet or the like, e.g., the inner circumference of the cover 5, a hollow, cylindrical motor can be formed.

Figure 8:
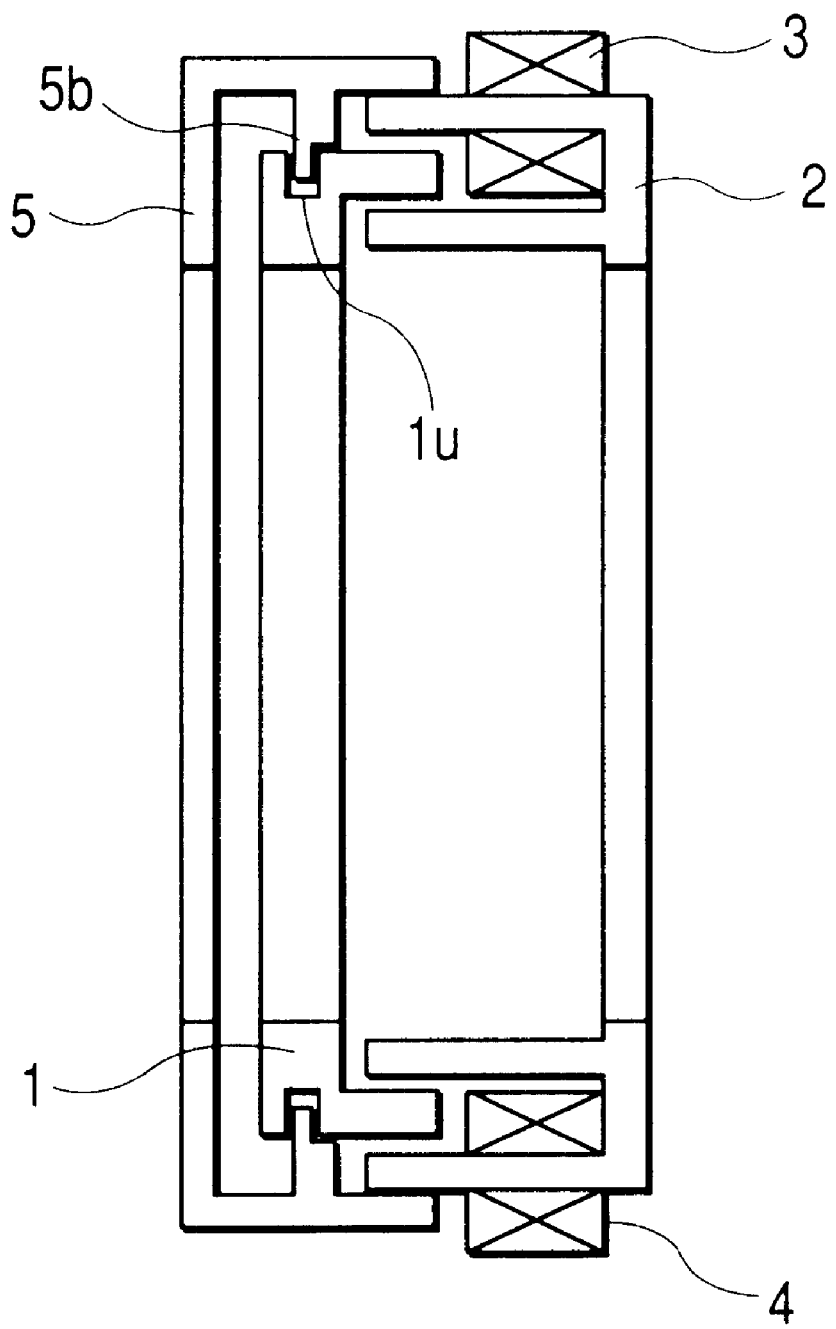
FIG. 8 is a view showing a modification of the motor in FIG. 1.

FIG. 8 shows such a structure as a modification.

A groove 1u is formed in the outer surface of the rotor 1 along entire circumference and fitted on a projection rib 5b of the cover 5. With this structure, the rotor 1 is rotatably held on the cover 5. If a projection is formed on the inner diameter portion of the rotor, this structure can be used to drive, for example, the lens, shutter, or aperture blades of a camera.

Figure 9:
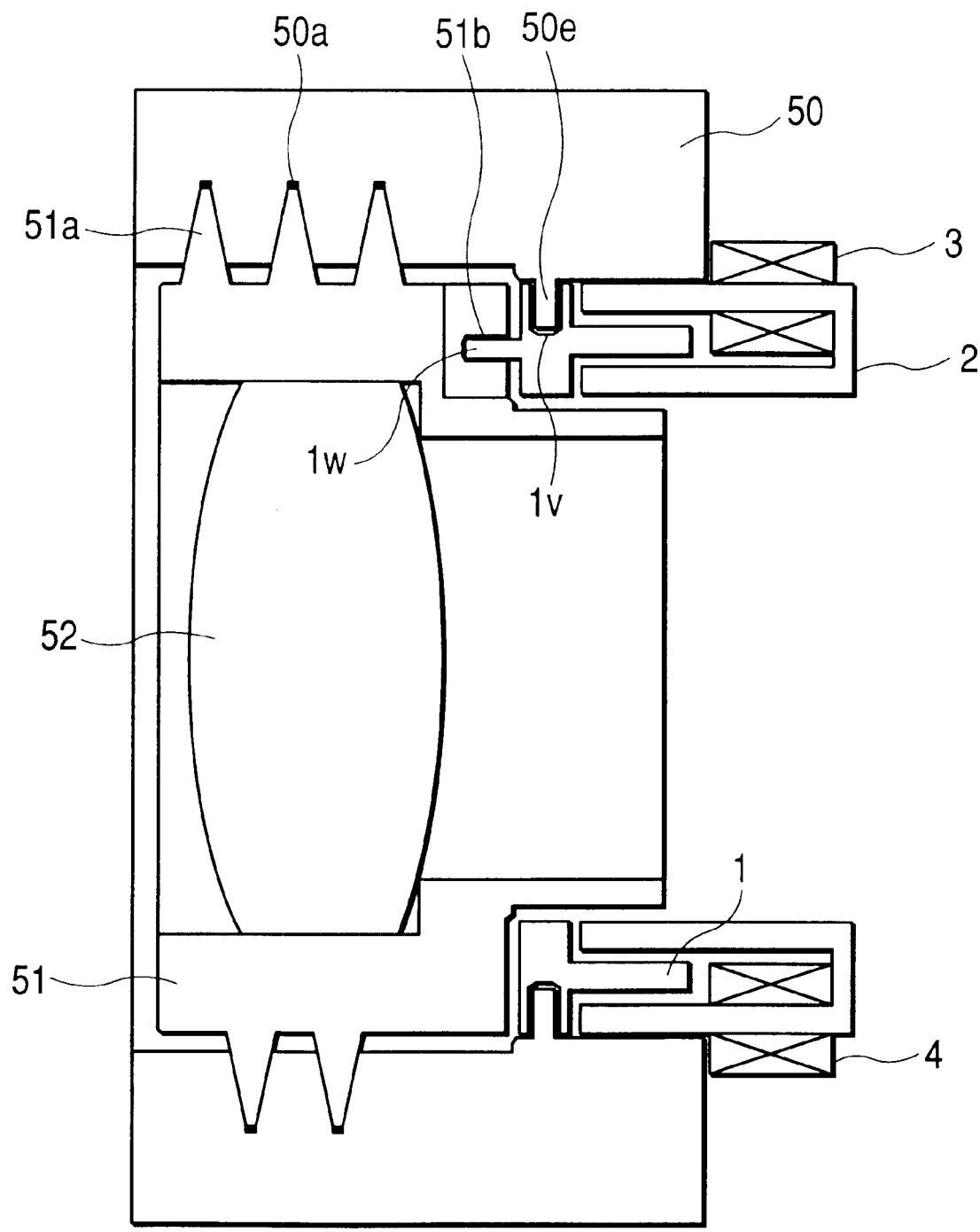
FIG. 9 is a sectional view showing a lens barrel unit using a motor as an example of the present invention.

FIG. 9 is a sectional view of the lens barrel of a photographing apparatus such as a camera or video camera in which the lens is driven by a motor to which the present invention is applied. The same reference numerals as in FIGS. 1 to 7 denote the same or similar parts in FIG. 9, and a detailed description thereof will be omitted.

Referring to FIG. 9, this structure includes a helicoid bottom plate 50 fixed the outer magnetic poles of the stator 2, and a lens holder 51. A female helicoid portion 50a is formed in the inner diameter portion of the helicoid bottom plate 50, and a male helicoid portion 51a is formed on the outer diameter portion of the lens holder 51. When the male helicoid portion 51a is slidably fitted in the female helicoid portion 50a, the lens holder 51 is so mounted as to move in the axial direction as it rotates relative to the helicoid bottom plate 50.

Referring to FIG. 9, a lens 52 is fixed to the lens holder 51. When the lens holder 51 rotates, this lens 52 moves (displaces) in the axial direction, together with the lens holder 51. This makes it possible to adjust the position of the lens 52.

The rotor 1 is rotatably fitted on a fitting portion 50e of the helicoid bottom plate 50 at a portion 1v. A groove 51b is formed in the inner end face portion of the lens holder 51. A pin portion 1w of the rotor 1 is fitted in this groove 51b. When, therefore, the lens holder 51 rotates upon rotation of the rotor 1, the lens 52 moves in the axial direction of the apparatus.

In the lens barrel unit shown in FIG. 9, the hollow portion (inner diameter portion) of the motor can be used as an optical path. That is, since the diameter of the motor corresponds to the sum of the size of the optical path and thicknesses of the inner magnetic poles, magnet, and outer magnetic poles, the lens barrel can be made compact.

Figure 10:
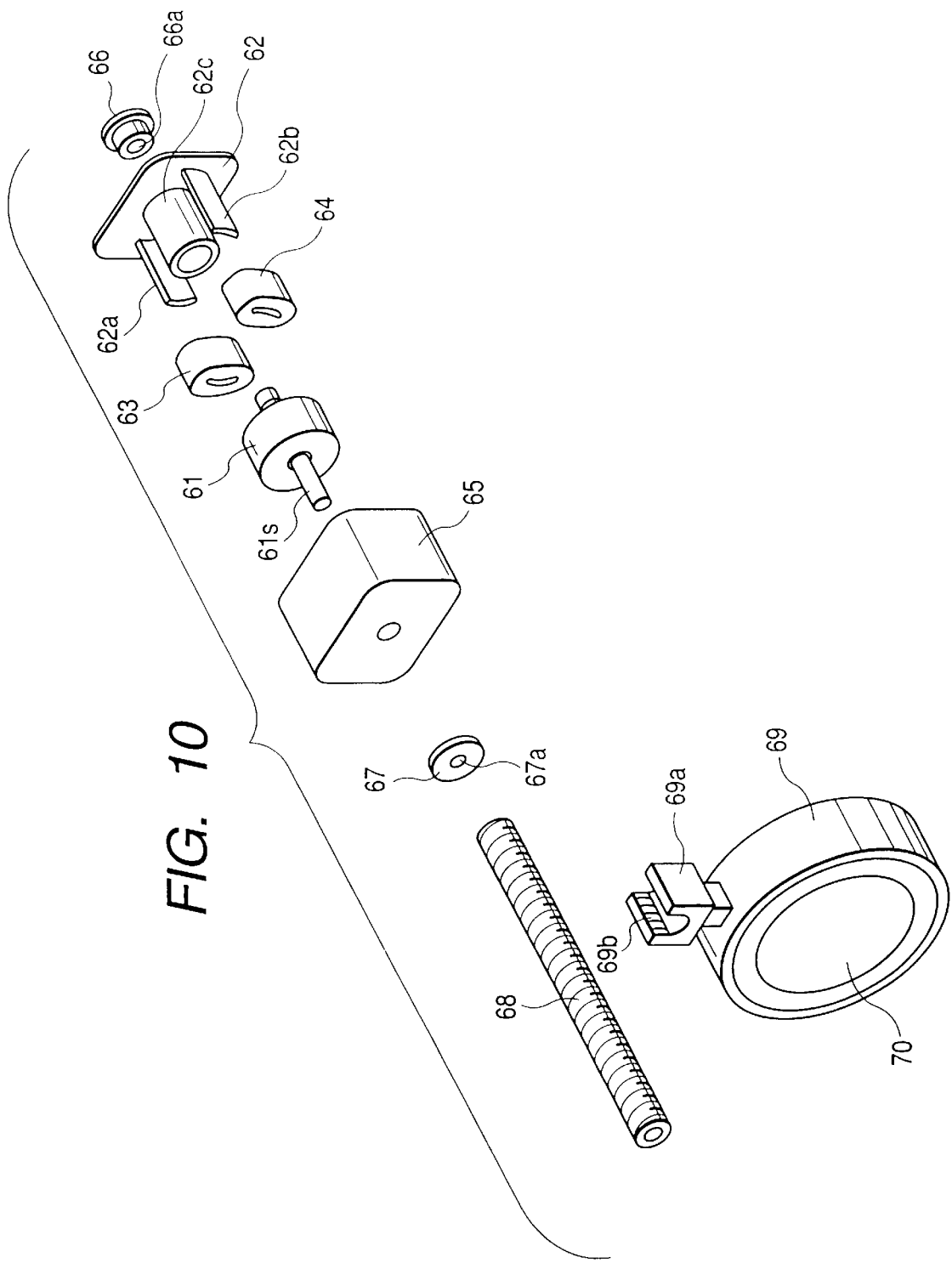
FIG. 10 is an exploded perspective view showing a motor as another example of the present invention.
Figure 11:
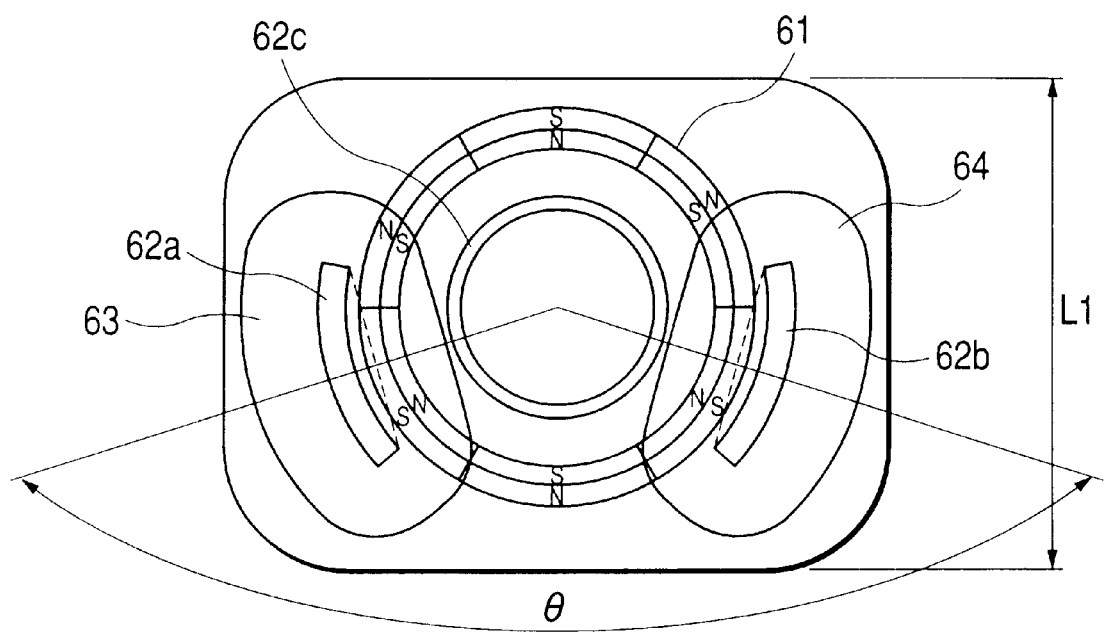
FIG. 11 is a sectional view taken along a plane perpendicular to the axial direction of the motor in FIG. 10.
Figure 12:
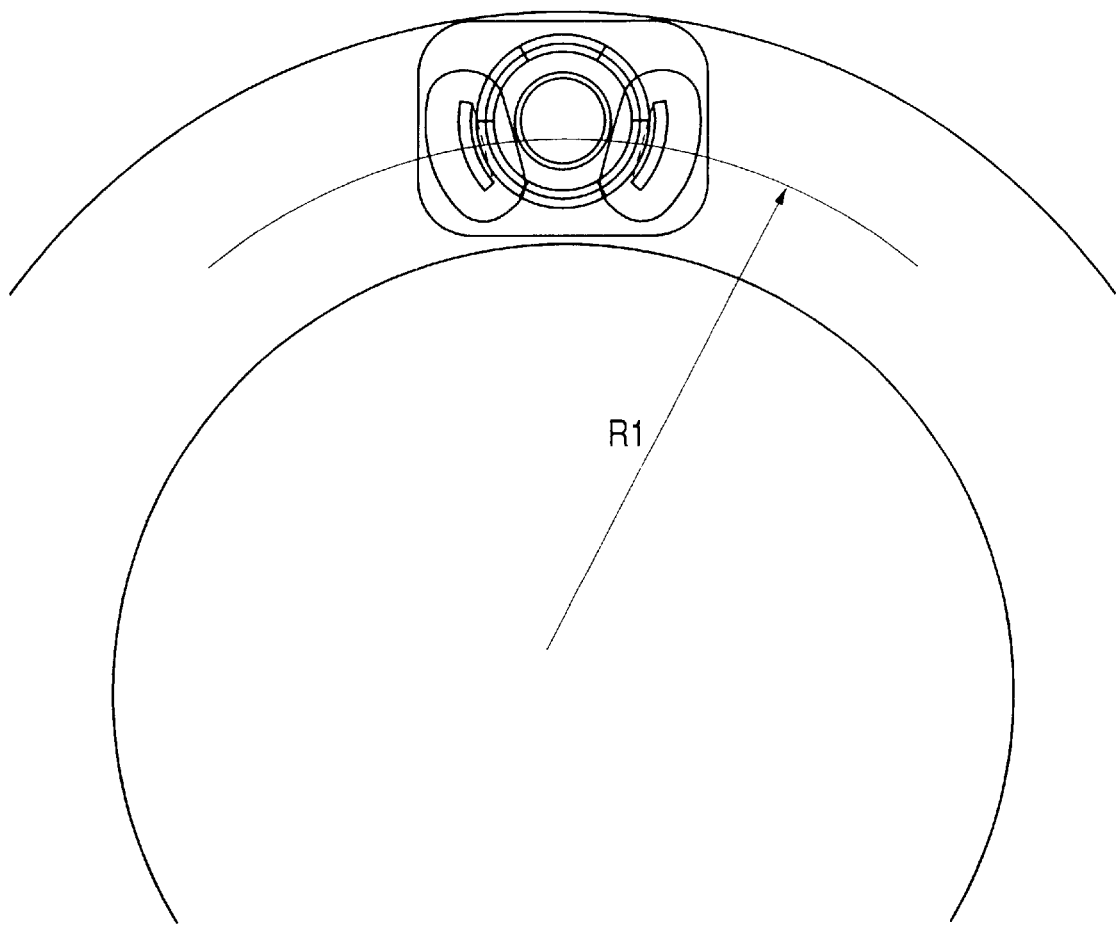
FIG. 12 is a view showing how the motor in FIG. 10 is placed in the lens barrel.

FIGS. 10 to 12 show another motor to which the present invention is applied. FIG. 10 is an exploded perspective view of the motor. FIG. 11 is an exploded plan view showing the relationship between the magnet, stator, coils, and the like of the motor. FIG. 12 is a plan view showing the lens barrel of a photographing apparatus such as a camera or video camera which incorporates the motor.

A rotor 61 is constituted by a shaft portion 61s and a cylindrical magnet formed from a permanent magnet. The outer surface of this magnet is divided into a plurality of portions (six portions, i.e., NA=6, in this embodiment), which are alternately magnetized to the S and N poles. The shaft portion 61s of the rotor 61 and cylindrical magnet may be integrally molded. Alternatively, they may be separately molded and coupled to each other with an adhesive or by press-fitting.

The magnet is made of a plastic magnet material. The magnet can be formed into a very thin cylindrical shape by injection molding or the like. The inner surface of the magnet is in one of the following states: having a weaker magnetization distribution than the outer surface; not magnetized at all; and magnetized to the opposite pole to that of the outer surface, that is, if a given outer surface portion is magnetized to the S pole, an inner surface portion in the corresponding range is magnetized to the N pole. The shaft portion 61s of the rotor 61 is rotatably fitted in a fitting hole 67a of a bearing 67 and a fitting hole 66a of a bearing 66 (which will be described later).

A stator 62 is made of a soft magnetic material, which has outer magnetic poles 62a and 62b and inner magnetic poles formed from an inner cylinder 62c. The bearing 66 is attached to the stator 62. In this embodiment, the inner cylinder 62c is also formed integrally with the first and second outer magnetic poles 62a and 62b. They may be molded as different members first, and then may be coupled to each other. The first and second outer magnetic poles 62a and 62b of the stator 62 are formed in sawtooth shapes extending in a direction parallel to the shaft portion 61s of the cylindrical rotor 61. These outer magnetic poles 62a and 62b face the outer surface of the magnet with a predetermined spacing. In this embodiment, the stator 62 is formed from a single member, and the first and second outer magnetic poles 62a and 62b are integrally formed. This makes it possible suppress mutual errors between the first and second outer magnetic poles 62a and 62b low and suppress variations in the performance of the motor due to assembly errors.

The inner cylinder 62c of the stator 62 forms inner magnetic poles facing the inner surface of the magnet of the rotor 61. The magnet of the rotor 61 is sandwiched between the inner magnetic pole formed by the inner cylinder 62c and the first outer magnetic pole 62a and between the inner magnetic pole formed by the inner cylinder 62c and the second outer magnetic pole 62b.

A first coil 63 is wound around the first outer magnetic pole 62a. When the first coil 63 is energized, it excites the first outer magnetic pole 62a and a portion of the inner cylinder 62c which serves as an inner magnetic pole and faces the first outer magnetic pole 62a. Obviously, the first outer magnetic pole and the inner magnetic pole which faces the first outer magnetic pole 62a are excited to different poles.

A second coil 64 is wound around the second outer magnetic pole 62b. When the second coil 64 is energized, it excites the second outer magnetic pole 62b and a portion of the inner cylinder 62c which serves as an inner magnetic pole and faces the second outer magnetic pole 62b. Obviously, the second outer magnetic pole and the inner magnetic pole which faces the second outer magnetic pole 62b are excited to different poles.

Both the first and second coils 63 and 64 are arranged on the same circumference of a circle outside the rotor 61.

The portion of the inner cylinder 62c which faces the first outer magnetic pole 62a is excited by the first coil 63. The portion of the inner cylinder 62c which faces the second outer magnetic pole 62b is excited by the second coil 64. These portions are excited independently of each other. The portion of the inner cylinder 62c which faces the first outer magnetic pole 62a and is excited by the first coil 63 will be referred to as the first inner magnetic pole hereinafter. The portion of the inner cylinder 62c which faces the second outer magnetic pole 62b and is excited by the second coil 64 will be referred to as the second inner magnetic pole hereinafter.

The first and second inner magnetic poles may be formed integrally as in this embodiment, or may be formed separately. The first and second inner magnetic poles may be formed into teeth-like portions extending in a direction parallel to the axis, like the first and second outer magnetic poles 62a and 62b, by notching the cylinder. All the first and second inner magnetic poles and first and second outer magnetic poles 62a and 62b can be formed from the stator 62 which is the single member. This makes it possible to position the respective magnetic poles with high precision. Therefore, variations in performance can be suppressed, and a reduction in cost can be achieved.

The first outer magnetic pole 62a and first inner magnetic pole of the stator 62 are so formed as to face the outer and inner surfaces of the magnet of the rotor 61 and sandwich the magnet. The second outer magnetic pole 62b and second inner magnetic pole are also so formed as to face the outer and inner surfaces of the magnet of the rotor 61 and sandwich the magnet.

When the first coil 63 is energized, the first outer magnetic pole 62a and the first inner magnetic pole are excited to generate a magnetic flux between the magnetic poles which flows through the magnet of the rotor 61. Likewise, when the second coil 64 is energized, the second outer magnetic pole 62b and the second inner magnetic pole are excited to generate a magnetic flux between the magnetic poles which flows through the magnet of the rotor 61. Since most of the magnetic fluxes generated from the coils flows between the outer magnetic poles and the inner magnetic poles, a high output level can be obtained with a small current.

When the rotor rotates, a magnetic flux flowing between the first outer magnetic pole 62a and the first inner magnetic pole and a magnetic flux flowing between the second outer magnetic pole 62b and the second inner magnetic pole alternately act on the same portion of the magnet. This makes it possible to obtain a motor with high rotation precision which is robust against the influence of magnetization irregularity of the magnet.

In addition, since the magnet, outer magnetic poles, and inner magnetic poles are all formed to have flat surfaces and be almost parallel to each other, the distance between the first outer magnetic pole 62a and the first inner magnetic pole and the distance between the second outer magnetic pole 62b and the second inner magnetic pole can be greatly reduced. This makes it possible to reduce the magnetic resistance of the magnetic circuit formed by the first coil 63, first outer magnetic pole 62a, and first inner magnetic pole and the magnetic resistance of the magnetic circuit formed by the second coil 64, second outer magnetic pole 62b, and second inner magnetic pole. Therefore, a large amount of magnetic flux can be generated with a small current, and an increase in the output of the motor, a reduction in power consumption, and a reduction in coil size can be attained.

The bearing 67 is attached to the center of a cover 65. The bearing 66 is attached to the stator 62. The shaft portion 61s of the rotor 61 is rotatably fitted in the bearings 67 and 66.

A lead screw 68 is fixed to the shaft portion 61s of the rotor 61 and rotates together with the rotor 61. A lens 70 is fixed to a lens holder 69. The lens holder 69 is so held by a guide (not shown) so as be movable in the optical axis direction. When a female thread portion 69b formed on a holding portion 69a threadably engages with the lead screw 68 and the lead screw 68 rotates, the lens holder 69 moves in a direction parallel to the optical axis.

As shown in FIG. 11, the angle defined by the center of the first outer magnetic pole 62a and the center of the second outer magnetic pole 62b is set to an angle θ with reference to the rotation center of the rotor 61. That is, the first and second outer magnetic poles 62a and 62b are positioned to have a phase shift angle θ. The phase of the first outer magnetic pole 62a with respect to the magnetized layer of the rotor 61 is shifted from the phase of the second outer magnetic pole 62b with respect to the magnetized layer of the rotor 61 by (180/NA)°. That is, in this embodiment, they are shifted from each other by 30°. At this time, θ can be expressed by (Y×360/NA−180/NA) where Y is a natural number equal to or less than NA. When this angle θ is one of the following angles: 30°, 90°, 150°, 210°, 270°, and 330°, the rotor can be rotated. If, however, the angle θ is set to 30° or 330°, and the first and second coils 63 and 64 are arranged, a size L1 of the motor becomes large. If the angle θ is set to 90° or 270°, the positions where magnetic force and electromagnetic force act on the rotor 61 become unbalanced. This tends to produce vibrations when the rotor rotates. Therefore, in order to suppress the size L1 small and prevent vibrations when the rotor rotates, the relationship represented by Y=NA/2 is preferably established. That is, with Y=3, the angle θ is preferably set to (180°−180°/NA), i.e., 150°. When the angle θ is set to 150°, since the positions where magnetic force and electromagnetic force act on the rotor 61 become almost laterally symmetrical, the generation of vibrations can be suppressed.

When the motor having the first and second outer magnetic poles 62a and 62b is to be mounted in a lens barrel, the first and second outer magnetic poles 62a and 62b are positioned on almost the same circle centered on the optical axis of the lens 70 or the first coil 63 for exciting the first outer magnetic pole 62a and the second coil 64 for exciting the second outer magnetic pole 62b are positioned on almost the same circle centered on the optical axis of the lens 70. In this embodiment, the first outer magnetic pole 62a, second outer magnetic pole 62b, first coil 63, and second coil 64 are all positioned at an equal distance R1 from the optical axis of the lens 70.

With the above arrangement, a very compact lens barrel can be formed.

Figure 13:
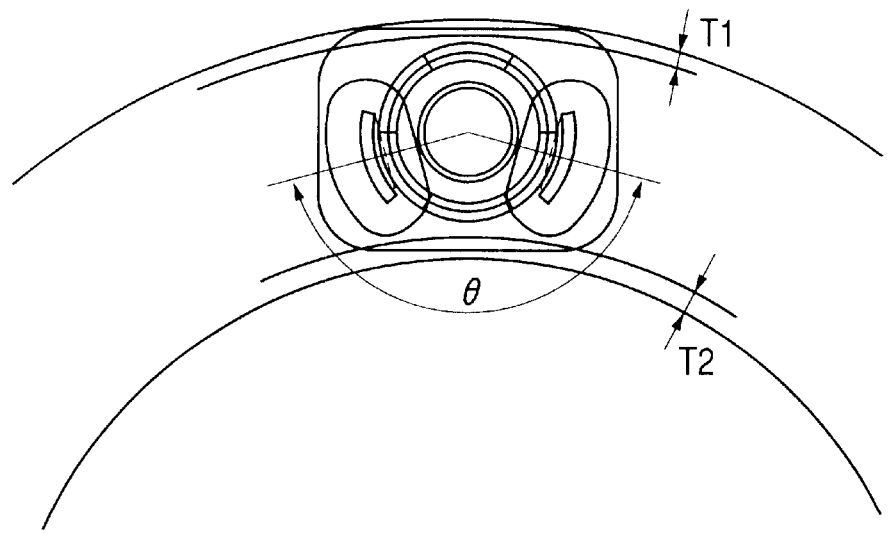
FIG. 13 is a view showing the positional relationship between the outer magnetic poles of the motor in FIG. 10 and the lens barrel.

Note that the centers of the first and second outer magnetic poles are preferably located closer to the optical axis than the rotation center of the rotor 61. FIG. 13 shows such a state. By partly notching the stator 62 and cover 65, the outer diameter of this structure can be decreased by T1 and the inner diameter can be increased by T2. This makes it possible to house the motor in the narrow cylindrical lens barrel.

Figure 14:
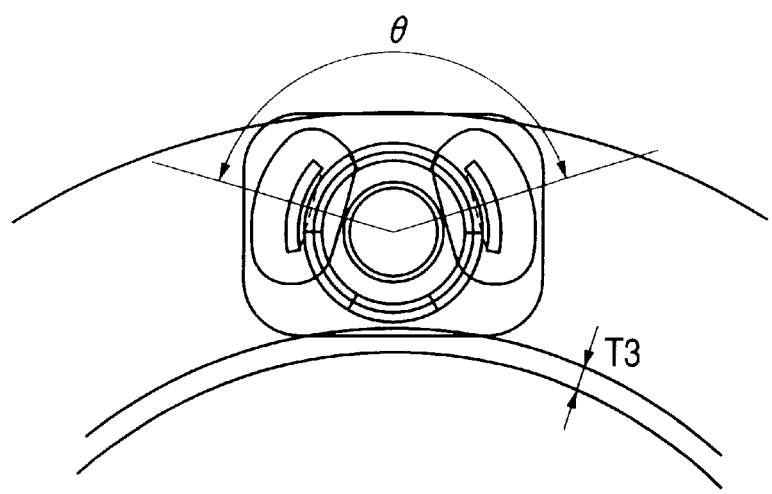
FIG. 14 is a view showing the positional relationship between the outer magnetic poles of the motor in FIG. 10 and the lens barrel.

FIG. 14 shows a case wherein the angle θ is present outside the rotation center of the rotor 61 with respect to the optical axis center. In this case, the first coil 63 and second coil 64 or first outer magnetic pole 62a and second outer magnetic pole 62b are not arranged along the cylindrical shape of the lens barrel. That is, the inner diameter can only be increased by T3.

Figure 15:
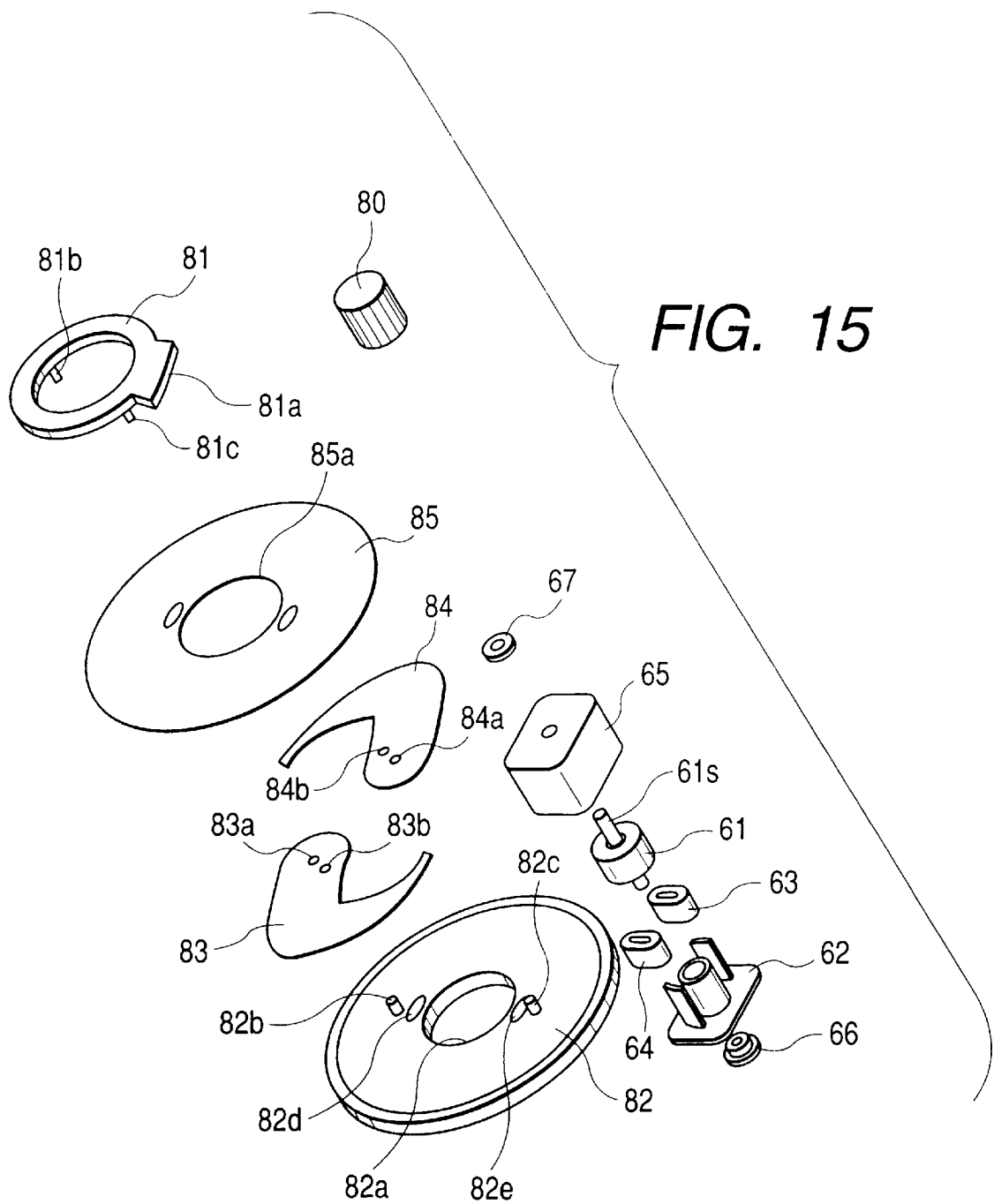
FIG. 15 is an exploded perspective view showing a light amount adjusting device using the motor in FIG. 10.
Figure 16:
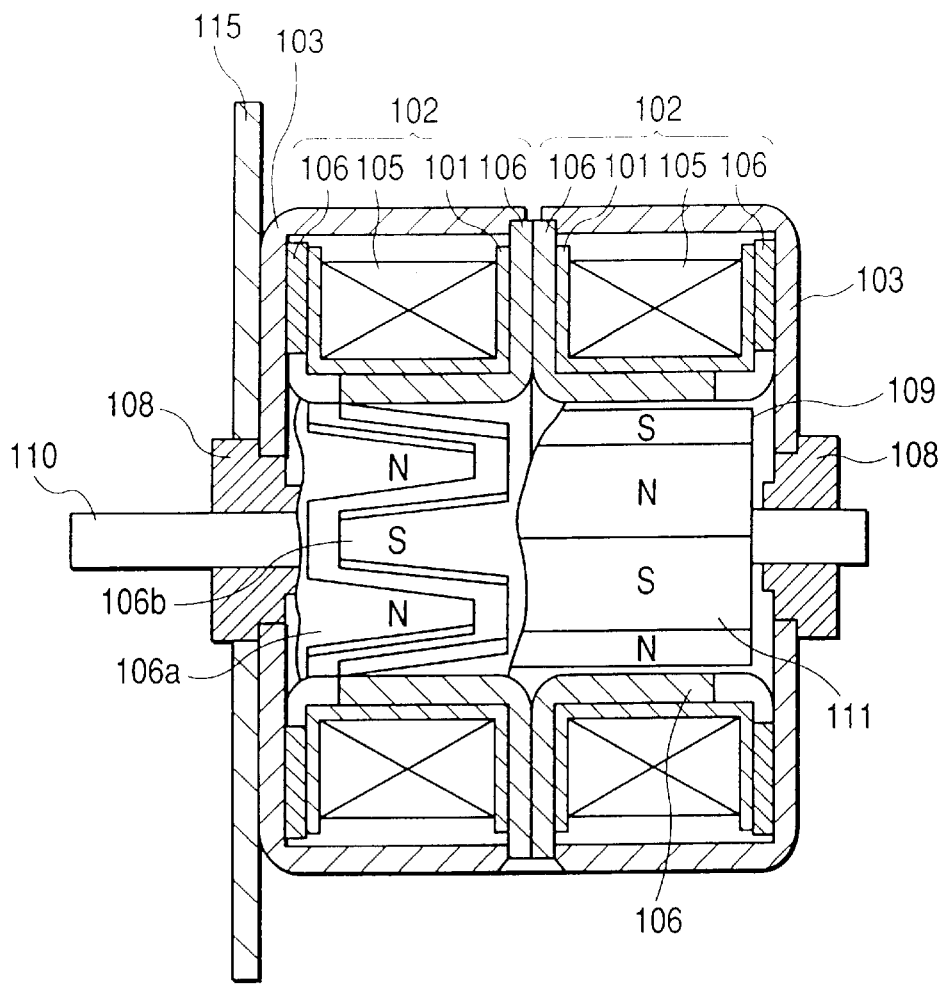
FIG. 16 is a sectional view showing an arrangement of a conventional stepping motor.
Figure 17:
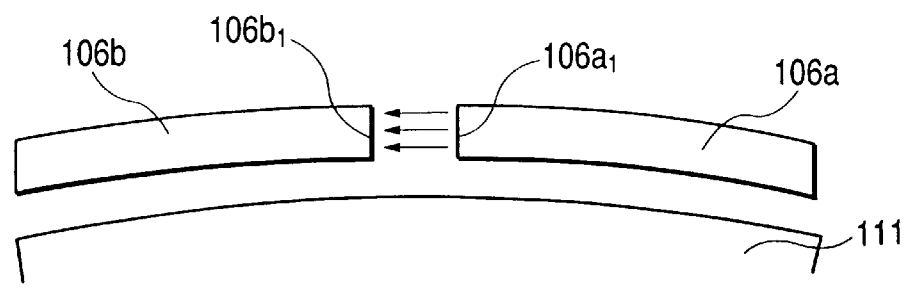
FIG. 17 is a partial sectional view schematically showing the state of magnetic fluxes from the stator of the stepping motor in FIG. 16.
Figure 18:
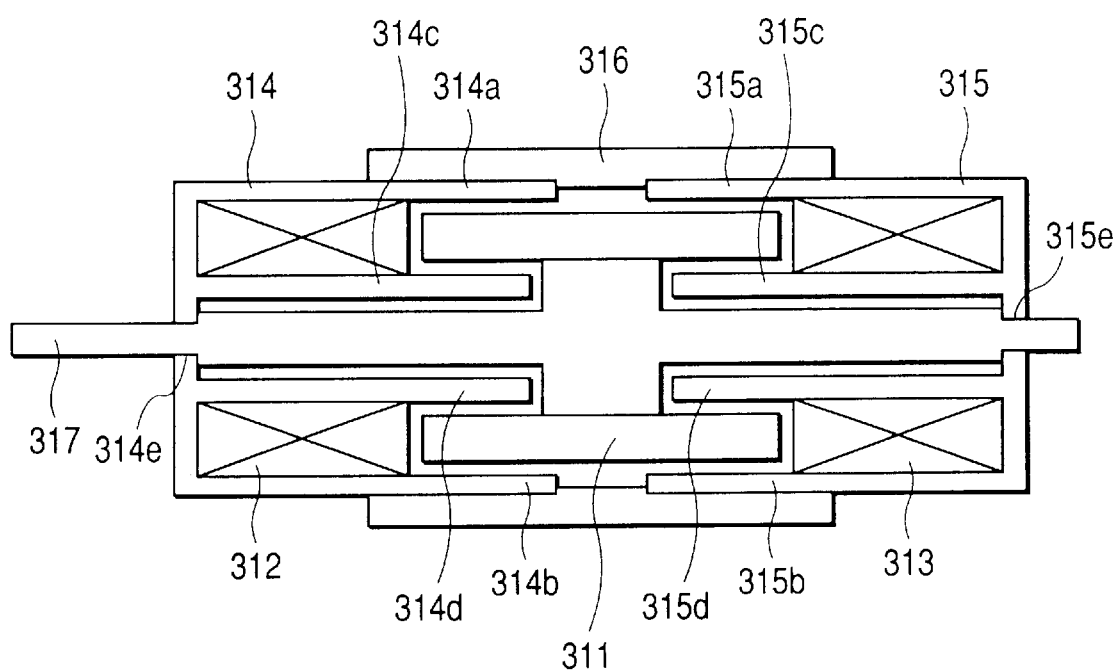
FIG. 18 is a sectional view showing another example of the structure of the conventional cylindrical stepping motor.
Figure 19:
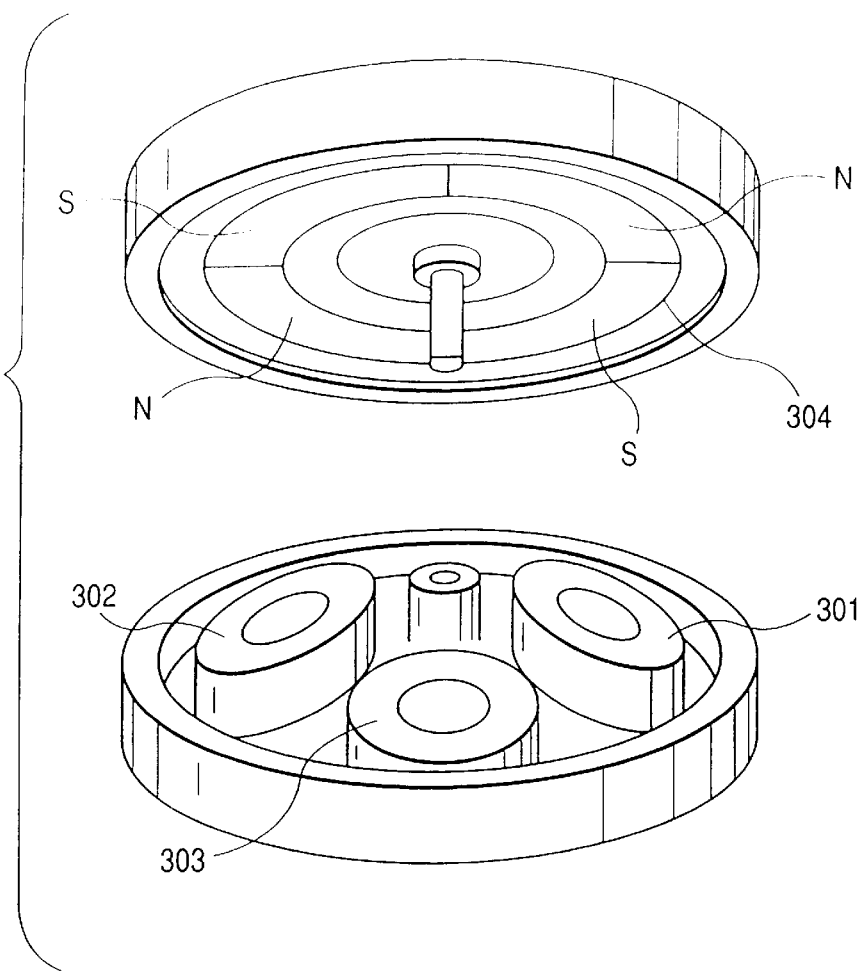
FIG. 19 is a view showing a conventional thin, coil-like motor.
Figure 20:
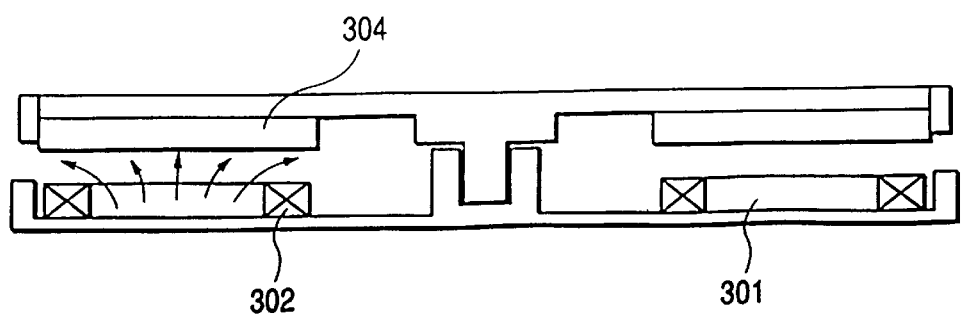
FIG. 20 is a sectional view showing the state of magnetic fluxes in the motor shown in FIG. 19.

FIG. 15 is an exploded perspective view of the aperture amount adjusting device of the photographing apparatus. An aperture amount adjusting member is driven by the motor shown in FIG. 10.

A pinion gear 80 is fixed to the shaft portion 61s of the rotor 61 and rotates together with the rotor 61. A blade driving ring 81 is rotatably mounted on a bottom plate (not shown). A gear portion 81a meshes with the pinion gear 80 and is driven by the rotor 61.

A bottom plate 82 has an aperture portion 82a in the center. Dowel pins 82b and 82c protruding in a direction parallel to the optical axis are integrally formed with the bottom plate 82. In addition, elliptic holes 82d and 82e are formed in the bottom plate 82. The dowel pins 81b and 81c of the blade driving ring 81 come into contact with the elliptic holes 82d and 82e to restrict the rotation of the blade driving ring 81. That is, the blade driving ring 81 can rotate within the range restricted by dowel pins 81b and 81c and elliptic holes 82d and 82e. This rotational angle is defined as an angle θ.

This device includes shutter blades 83 and 84. A round hole 83a of the shutter blade 83 is rotatably fitted on the dowel pin 82b of the bottom plate 82. An elliptic hole 83b of the shutter blade 83 is slidably fitted on the dowel pin 81b of the blade driving ring 81. A round hole 84a of the shutter blade 84 is fitted on the dowel pin 82c of the bottom plate 82. An elliptic hole 84b of the shutter blade 84 is slidably fitted on the dowel pin 81c of the blade driving ring 81.

A maximum aperture portion 85a for restricting a maximum aperture amount is formed in the center of a shutter blade press plate 85. The shutter blade press plate 85 is fixed to the bottom plate 82 while the shutter blades 83 and 84 are sandwiched therebetween with a predetermined space, thus holding the shutter blades 83 and 84 in the axial direction.

When the blade driving ring 81 rotates, the shutter blade 83 rotates about the round hole 83a with the elliptic hole 83b being pushed by the dowel pin 81b of the blade driving ring 81, and the shutter blade 84 rotates about the round hole 84a with the elliptic hole 84b being pushed by the dowel pin 81c of the blade driving ring 81. In this manner, the shutter blades 83 and 84 are driven between a light-shielding position where the maximum aperture portion 85a of the shutter blade press plate 85 and the aperture portion 82a of the bottom plate 82 are covered and an exposure position where light is allowed to pass through.

In the aperture amount adjusting device in FIG. 15 as well, the first and second outer magnetic poles 62a and 62b are positioned on almost the same circle centered on the optical axis of a lens (not shown) or the optical axis of the maximum aperture portion of the light amount adjusting deice. Alternatively, the winding center of the first coil 63 for exciting the first outer magnetic pole 62a and the winding center of the second coil 64 for exciting the second outer magnetic pole 62b are positioned on almost the same circle centered on the optical axis of the lens (not shown) or the optical axis of the maximum aperture portion of the light amount adjusting device. With this arrangement, a size D3 in FIG. 21 can be further decreased, and a very compact lens barrel can be obtained.

As described above, according to the motor shown in FIGS. 1 to 15, as compared with the conventional compact motor, a motor having a simple structure can be provided, which attains further reductions in diameter and length in the rotational axis direction and is constituted by a small number of parts. In addition, since two magnetic circuits for driving a motor act on the same portion of a rotor, a motor with high rotation precision which is robust against the influence of magnetization irregularity of a rotor can be provided.

What is claimed is:

1. A motor comprising:
    a rotor having a cylindrical magnet having an outer surface divided into portions in a circumferential direction which are alternately magnetized to different poles;
    a first outer magnetic pole which is excited by a first coil and faces the outer surface of the magnet within a first predetermined angular range;
    a first inner magnetic pole which is excited by the first coil and faces an inner surface of the magnet;
    a second outer magnetic pole which is excited by a second coil and faces the outer surface of the magnet within a second predetermined angular range; and
    a second inner magnetic pole which is excited by the second coil and faces the inner surface of the magnet,
    wherein said first and second outer magnetic poles are positioned on the same circumference centered on the magnet.

2. A motor according to claim 1, wherein letting NA be the number of portions of the outer surface of the rotor which are magnetized, a phase of said first outer magnetic pole corresponding to a magnetized portion of the magnet is shifted from a phase of said second outer magnetic pole corresponding to a magnetized portion of the magnet by (180/NA)°.

3. A motor according to claim 1, wherein said first and second outer magnetic poles are formed in sawtooth shapes extending in a rotational axis direction of said rotor.

4. A motor comprising:
   a rotatable rotor having a cylindrical magnet having an outer surface alternately magnetized to different poles in a circumferential;
   a first outer magnetic pole which is excited by a first coil and faces the outer surface of the magnet;
   a second outer magnetic pole which is excited by a second coil and faces the outer surface of the magnet; and
   an inner magnetic pole which faces an inner surface of the magnet,
   wherein said first and second outer magnetic poles are positioned on the same circumference centered on the magnet, and when the center of one outer magnetic pole faces the center of a pole of the magnet, the center of the other outer magnetic pole faces a boundary portion between poles of the magnet.

5. A motor according to claim 4, wherein said first and second coils are positioned between said outer magnetic pole and said inner magnetic pole, and are adjacent to the magnet in a rotational axis direction of said rotor.

6. A motor according to claim 4, wherein said first and second outer magnetic poles are formed in sawtooth shapes extending in a rotational axis direction of said rotor.

7. A motor comprising:
   a rotatable rotor having a cylindrical magnet having an outer surface alternately magnetized to different poles in a circumferential;
   a stator having one cylindrical portion facing the outer surface of the magnet and one cylindrical portion facing an inner surface of the magnet; and
   a coil to excite an upper portion of the cylindrical portion which faces the outer surface,
   wherein the cylindrical portion facing the outer surface has a plurality of sawtooth-like portions formed from notches formed from one end to the other end of the cylindrical portion, and the sawtooth-like portions form first and second magnetic poles for which excitation is switched at different timings.

8. A motor according to claim 7, wherein letting NA be the number of portions of the outer surface of the rotor which are magnetized, a phase of said first outer magnetic pole corresponding to a magnetized portion of the magnet is shifted from a phase of said second outer magnetic pole corresponding to a magnetized portion of the magnet by (180/NA)°.

9. A motor according to claim 7, wherein when the center of one of said first and second magnetic poles faces the center of a pole of the magnet, the center of the other of said magnetic poles faces a boundary portion between poles of the magnet.

10. A motor according to claim 7, wherein said coil is positioned between the cylindrical portion facing the outer surface and the cylindrical portion facing the inner surface and adjacent to the magnet in a rotational axis direction of said rotor.

11. A motor according to claim 8, wherein an angle defined by the first and second magnetic poles is (180−180/NA)° with respect to a rotation center of said rotor.

12. A photographing apparatus comprising:
    a motor including
       a rotor having a cylindrical magnet having an outer surface divided into portions in a circumferential direction which are alternately magnetized to different poles,
       a first outer magnetic pole which is excited by a first coil and faces the outer surface of the magnet within a first predetermined angular range,
       a first inner magnetic pole which is excited by the first coil and faces an inner surface of the magnet,
       a second outer magnetic pole which is excited by a second coil and faces the outer surface of the magnet within a second predetermined angular range, and
       a second inner magnetic pole which is excited by the second coil and faces the inner surface of the magnet,
       wherein said first and second outer magnetic poles are positioned on the same circumference centered on the magnet;
    a lead screw which rotates together with the rotor of said motor; and
    a lens holder which engages with said lead screw and displaces upon rotation of said lead screw.

13. An apparatus according to claim 12, wherein a winding center of the first coil and a winding center of the second coil are positioned on sub scanning the same circle centered on an optical axis.

14. A photographing apparatus comprising:
    a motor including
       a rotatable rotor having a cylindrical magnet having an outer surface alternately magnetized to different poles in a circumferential,
       a first outer magnetic pole which is excited by a first coil and faces the outer surface of the magnet,
       a second outer magnetic pole which is excited by a second coil and faces the outer surface of the magnet, and
       an inner magnetic pole which faces an inner surface of the magnet,
       wherein said first and second outer magnetic poles are positioned on the same circumference centered on the magnet, and when the center of one outer magnetic pole faces the center of a pole of the magnet, the center of the other outer magnetic pole faces a boundary portion between poles of the magnet;
    a lead screw which rotates together with the rotor of said motor; and
    a lens holder which engages with said lead screw and displaces upon rotation of said lead screw.

15. An apparatus according to claim 14, wherein a winding center of the first coil and a winding center of the second coil are positioned on sub scanning the same circle centered on an optical axis.

16. A photographing apparatus comprising:
    a motor including
       a rotor having a cylindrical magnet having an outer surface divided into portions in a circumferential direction which are alternately magnetized to different poles,
       a first outer magnetic pole which is excited by a first coil and faces the outer surface of the magnet within a first predetermined angular range,
       a first inner magnetic pole which is excited by the first coil and faces an inner surface of the magnet,
       a second outer magnetic pole which is excited by a second coil and faces the outer surface of the magnet within a second predetermined angular range, and a second inner magnetic pole which is excited by the second coil and faces the inner surface of the magnet, wherein said first and second outer magnetic poles are positioned on the same circumference centered on the magnet; and a shutter blade which performs open and close operation upon being interlocked with the rotor of said motor.

17. An apparatus according to claim 16, wherein a winding center of the first coil and a winding center of the second coil are positioned on sub scanning the same circle centered on an optical axis.

18. A photographing apparatus comprising:

a motor including a rotatable rotor having a cylindrical magnet having an outer surface alternately magnetized to different poles in a circumferential, a first outer magnetic pole which is excited by a first coil and faces the outer surface of the magnet, a second outer magnetic pole which is excited by a second coil and faces the outer surface of the magnet, and an inner magnetic pole which faces an inner surface of the magnet, wherein said first and second outer magnetic poles are positioned on the same circumference centered on the magnet, and when the center of one outer magnetic pole faces the center of a pole of the magnet, the center of the other outer magnetic pole faces a boundary portion between poles of the magnet; and a shutter blade which performs open and close operation upon being interlocked with the rotor of said motor.

19. An apparatus according to claim 18, wherein a winding center of the first coil and a winding center of the second coil are positioned on sub scanning the same circle centered on an optical axis.

* * * * *